US011195175B2

(12) United States Patent
Ng (10) Patent No.: US 11,195,175 B2
(45) Date of Patent: Dec. 7, 2021

(54) SYSTEMS AND METHODS FOR ELECTRONIC PAYMENT PROCESSING BASED ON TYPED GRAPH OF PAYMENT LIFECYCLE (71) Applicant: WEPAY, INC., Redwood City, CA (US)

(72) Inventor: Raymond Ng, Palo Alto, CA (US)

(73) Assignee: WEPAY, INC., Redwood City, CA (US)

(*) Notice: Subject to any disclaimer, the term of this patent is extended or adjusted under 35 U.S.C. 154(b) by 559 days.

(21) Appl. No.: 15/502,483

(22) PCT Filed: Aug. 12, 2016

(86) PCT No.: PCT/US2016/046814
§ 371 (c)(1),
(2) Date: Feb. 7, 2017

(87) PCT Pub. No.: WO2018/022116
PCT Pub. Date: Feb. 1, 2018

(65) Prior Publication Data
US 2018/0218362 A1 Aug. 2, 2018

Related U.S. Application Data (60) Provisional application No. 62/367,596, filed on Jul. 27, 2016.

(51) Int. Cl.
G06Q 20/02 (2012.01)
G06Q 20/38 (2012.01)
(Continued)

(52) U.S. Cl.
CPC ............ G06Q 20/389 (2013.01); G06F 8/34 (2013.01); G06F 8/51 (2013.01); G06F 9/4498 (2018.02);
(Continued)

(58) Field of Classification Search
CPC ........ G06Q 20/38; G06Q 20/40; G06Q 40/02; G06F 9/4498; G06F 16/2264; G06F 8/34; G06F 8/51
(Continued)

(56) References Cited

U.S. PATENT DOCUMENTS

2004/0002918 A1* 1/2004 McCarthy .......... G06Q 20/4016
705/40
2005/0177494 A1* 8/2005 Kelly .................... G06Q 40/02
705/39
(Continued)

FOREIGN PATENT DOCUMENTS

JP 2002-298059 A 10/2002

OTHER PUBLICATIONS

Title: SmartVista i: High-performance payment processing solution on IBM System i Authors: Maxim Khandros et al. Date: Feb. 2008 (Year: 2008).*
(Continued)

Primary Examiner — Christopher Bridges
Assistant Examiner — Yongsik Park
(74) Attorney, Agent, or Firm — Duane Morris LLP; Manita Rawat (57) ABSTRACT A approach is proposed to support typed payment graph-based electronic payment processing. First, schemas for one or more typed payment graphs used for a plurality types of electronic payment processing are defined declaratively. Upon receiving an electronic payment request from a client, a payment processing engine retrieves a schema of a typed payment graph corresponding to the request and processes the electronic payment by traversing states and edges in an instance created from the schema of the typed payment graph. The electronic payment only transitions from one state to another if a valid edge exists between them and a
(Continued)

precondition on the edge is met by the processing results of the electronic payment at the state. While processing the electronic payment, the payment processing engine automatically generates an audit trail for the electronic payment based on its states and transitions for real time recovery and/or analysis.

17 Claims, 5 Drawing Sheets

(51) Int. Cl.
    *G06F 16/22*     (2019.01)
    *G06Q 40/02*     (2012.01)
    *G06F 9/448*     (2018.01)
    *G06F 8/34*     (2018.01)
    *G06Q 20/40*     (2012.01)
    *G06F 8/51*     (2018.01)
    *G06F 9/54*     (2006.01)

(52) U.S. Cl.
    CPC .......... *G06F 9/541* (2013.01); *G06F 16/2264* (2019.01); *G06Q 20/38* (2013.01); *G06Q 20/405* (2013.01); *G06Q 40/02* (2013.01); *G06Q 20/40* (2013.01)

(58) Field of Classification Search
    USPC .......................................... 705/39
    See application file for complete search history.

(56) References Cited

U.S. PATENT DOCUMENTS

| | | | | |
|---|---|---|---|---|
| 2010/0114586 A1* | 5/2010 | Barros | ................... | G06Q 10/06 705/1.1 |
| 2011/0197207 A1* | 8/2011 | Bhargava | ......... | G06Q 10/06316 719/318 |
| 2012/0226670 A1* | 9/2012 | Arcushin | ............... | G06Q 30/06 707/692 |
| 2013/0018902 A1* | 1/2013 | Vickers | ..................... | G06F 8/51 707/756 |
| 2014/0095379 A1* | 4/2014 | Williams | ............. | G06Q 20/405 705/39 |
| 2015/0040102 A1* | 2/2015 | Adams-Moran | ........ | G06F 8/311 717/116 |
| 2016/0034883 A1* | 2/2016 | Amos | ................... | G07F 19/206 705/35 |
| 2017/0109759 A1* | 4/2017 | Korb | .................... | G06Q 30/018 |
| 2017/0140382 A1* | 5/2017 | Chari | ................... | G06Q 20/389 |
| 2017/0344994 A1* | 11/2017 | Wang | .................... | G06Q 50/01 |

OTHER PUBLICATIONS

PCT International Search Report and Written Opinion dated Apr. 26, 2017, from International Patent Application No. PCT/US2016/046814, 14 pages.

\* cited by examiner

```
CREATE GRAPHIC PaymentState {

New,
    Authorized,
    Reviewed,
    Captured,
    Failed

Edge {

AuthPass(New -> Authorized),
        AuthFail(New -> Failed),
        ReviewPass(Authorized -> Reviewed),
        ReviewFail(Authorized -> Failed),
        CapturePass(Reviewed -> Captured),
        CaptureFail(Reviewed -> Failed)

```
public class TypedCCPaymentState {
    public enum New implements TypedPaymentState {
        INSTANCE;
        public TypedResult handle(final AuthPass event) {
            return TypedResult.of(true, Authorized.INSTANCE);
        }
        public TypedResult handle(final AuthFail event) {
            return TypedResult.of(true, Failed.INSTANCE);
        }
    }
    public enum Failed implements TypedPaymentState {
        INSTANCE;
    }
    public enum Authorized implements TypedPaymentState {
        INSTANCE;
        public TypedResult handle(final ReviewPass event) {
            return TypedResult.of(true, Reviewed.INSTANCE);
        }
        public TypedResult handle(final ReviewFail event) {
            return TypedResult.of(true, Failed.INSTANCE);
        }
    }
}
```

SYSTEMS AND METHODS FOR ELECTRONIC PAYMENT PROCESSING BASED ON TYPED GRAPH OF PAYMENT LIFECYCLE

CROSS-REFERENCE TO RELATED APPLICATIONS

This application is a U.S. national stage application under U.S.C. § 371 of International Patent Application No. PCT/US16/46814, filed Aug. 12, 2016, which claims the benefit of U.S. Provisional Patent Application No. 62/367,596, filed Jul. 27, 2016, and entitled "ELECTRONIC PAYMENT PROCESSING BASED ON TYPED GRAPH OF PAYMENT LIFECYCLE," the entireties of each are expressly incorporated herein in its entirety by reference.

BACKGROUND

An electronic payment submitted via, for non-limiting examples, a stripe credit card, an EMV smart card, e-check, etc., typically goes through a number of payment states in its payment lifecycle. The following is a simplified linear state transition diagram for a traditional ('stripe') credit card payment:
NEW=>AUTHORIZED=>CAPTURED In order to handle various payment technologies (e.g., EMV), business rules (Reviews), use cases (e.g., Cancelation, Refunds, Chargebacks, Recurring, etc.) and error conditions (e.g., integrator issues, timeouts, retries, etc.) involved in processing the electronic payment, the state transition diagram can become complex very quickly. The following table is a partial summary of an example of implementation of the state transitions involved in a simple credit card payment:

| Payment | Authorization | Review |
|---|---|---|
| New | New | |
| Authorizing | Running | |
| | Authorized | |
| Authorized | | |
| | | New |
| AuthProcessed | | |
| | | Analyzing |
| | | In Review |
| | | Passed |
| Started | | |
| | Captured | |
| Captured | | |

As shown by the table above, the Payment, Authorization and Review states are all implemented as (linearly) stateful objects. Today, it is common to represent/model the various states and transitions that an electronic payment goes through in a payment cycle via a potentially distributed finite state machine (FSM), which determines the current state of a specific payment by looking at these objects together. However, such an approach often suffers from one or more of the following problems. Specifically, state transitions are not recorded in a robust manner, hence it is often difficult to figure out how a specific electronic payment arrive at a specific payment state. In addition, state transitions are not typed and therefore it is difficult (often impossible without human involvement) to reliably reconstruct an accurate audit trail for the electronic payment. Furthermore, state transitions have no attributes (no payload) and therefore the specific "reason" for a state transition is not reliably determined. A better way to represent and model an electronic payment cycle for online payment processing.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support typed payment graph-based electronic payment processing. First, schemas for one or more typed payment graphs used for a plurality types of electronic payment processing are defined declaratively via Data Definition Language (DDL). Upon receiving an electronic payment request from a client, a payment processing engine retrieves a schema of a typed payment graph corresponding to the request and processes the electronic payment by traversing states and edges in an instance created from the schema of the typed payment graph. The electronic payment only transitions from one state to another if a valid edge exists between them and a precondition on the edge is met by the processing results of the electronic payment at the state. While processing the electronic payment, the payment processing engine automatically generates an audit trail for the electronic payment based on its states and transitions for real time recovery and/or analysis.

Under the proposed typed graph-based payment processing approach, only well-defined/typed transitions between payment states are allowed during processing of an electronic payment, wherein the electronic payment is transitioned from one state to another in its payment lifecycle definitively at every state without any ambiguities and thus eliminates stuck payment possibilities. Such approach results in a robust implementation of the electronic payment process, which fully supports machine readable and type-checked audit trails. For a non-limiting example, an electronic payment may be canceled by the client or by a timeout. The electronic payment may also be rejected by the payment processing engine or by an in-house risk team. When this happens, typing is a robust way to re-construct the complete audit trail of such canceled or rejected payment. In addition, strong typing of not only the vertices and edges but also the attributes of the edges in the payment graph allows the payment processing engine to differentiate between different transitions/edges starting and ending at the same states/vertices but having different attributes and the guide the processing of the electronic payment accordingly through its payment lifecycle. Since the allowable transitions between the payment states in the typed payment graph are defined declaratively and checked before run time, the proposed approach avoids possible runtime error due to corrupted data.

Figure 1:
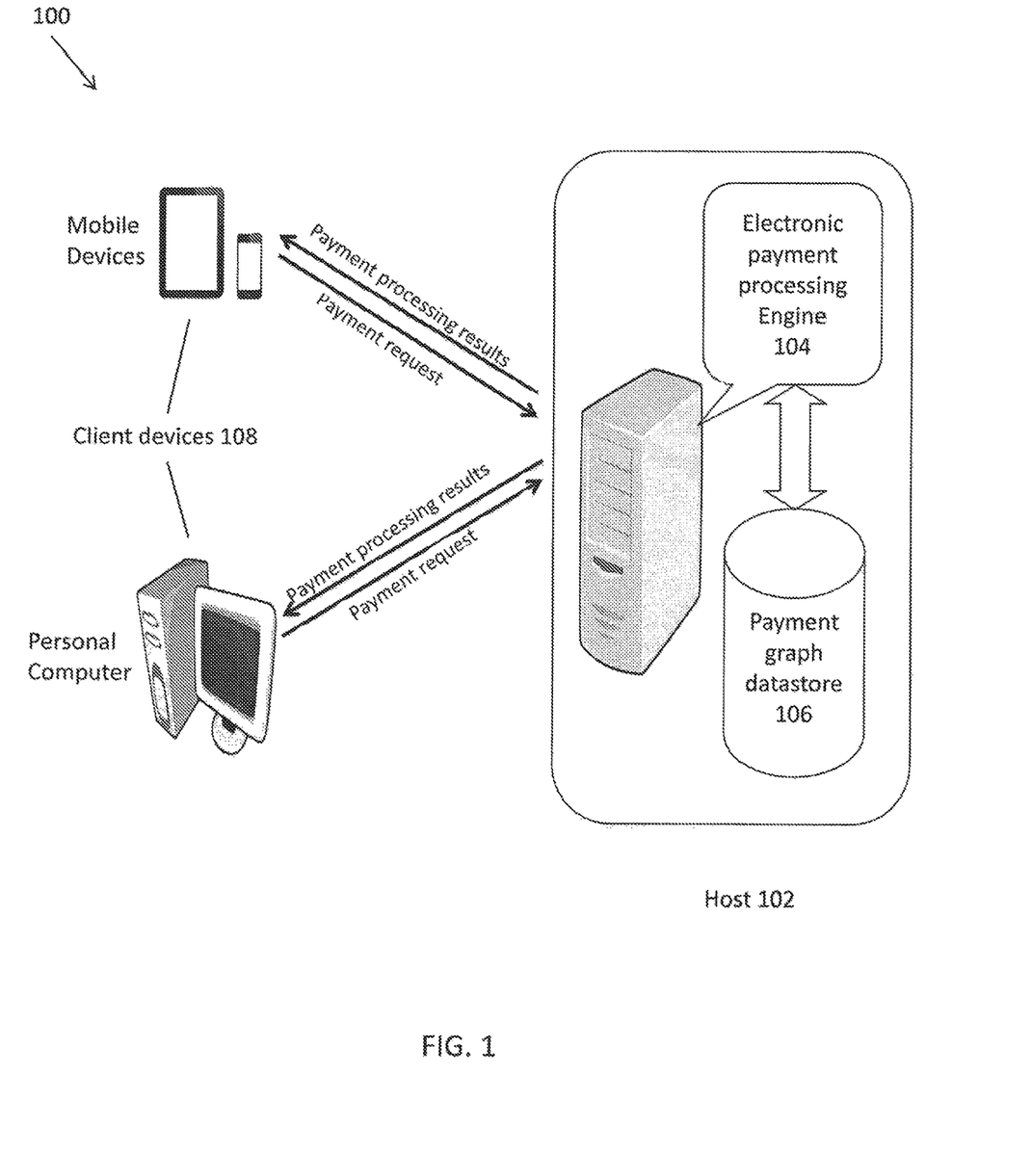
FIG. 1 depicts an example of a system diagram to support typed payment graph-based electronic payment processing in accordance with some embodiments.

FIG. 1 depicts an example of a diagram of system 100 to support typed payment graph-based electronic payment processing. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least electronic payment processing engine 104 and payment graph datastore 106, each running on a computing unit/appliance/host 102 with software instructions stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units of the computing unit, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the computing unit to create specific logic circuits.

In the example of FIG. 1, the host 102 can be a computing device, a communication device, a storage device, or any computing device capable of running a software component. For non-limiting examples, a computing device can be but is not limited to a laptop PC, a desktop PC, a tablet PC, or an x86 or ARM-based a server running Linux or other operating systems. In some embodiments, the host 102 has a communication interface (not shown), which enables the electronic payment processing engine 104 and/or the payment graph datastore 106 running on the host 102 to communicate with client devices 108 following certain communication protocols, such as TCP/IP, http, https, ftp, and sftp protocols, over one or more communication networks (not shown). Here, the client devices 108 are utilized by clients to initiate electronic payment requests to the electronic payment processing engine 104, wherein the client devices reside either locally or remotely (e.g., in a cloud) from the host 102. As shown in the example of FIG. 1, the client devices 108 include but are not limited to, mobile/hand-held devices such as tablets, iPhones, iPads, Google's Android devices, and/or other types of mobile communication devices, PCs, such as laptop PCs and desktop PCs, and server machines. The communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

Figure 2:
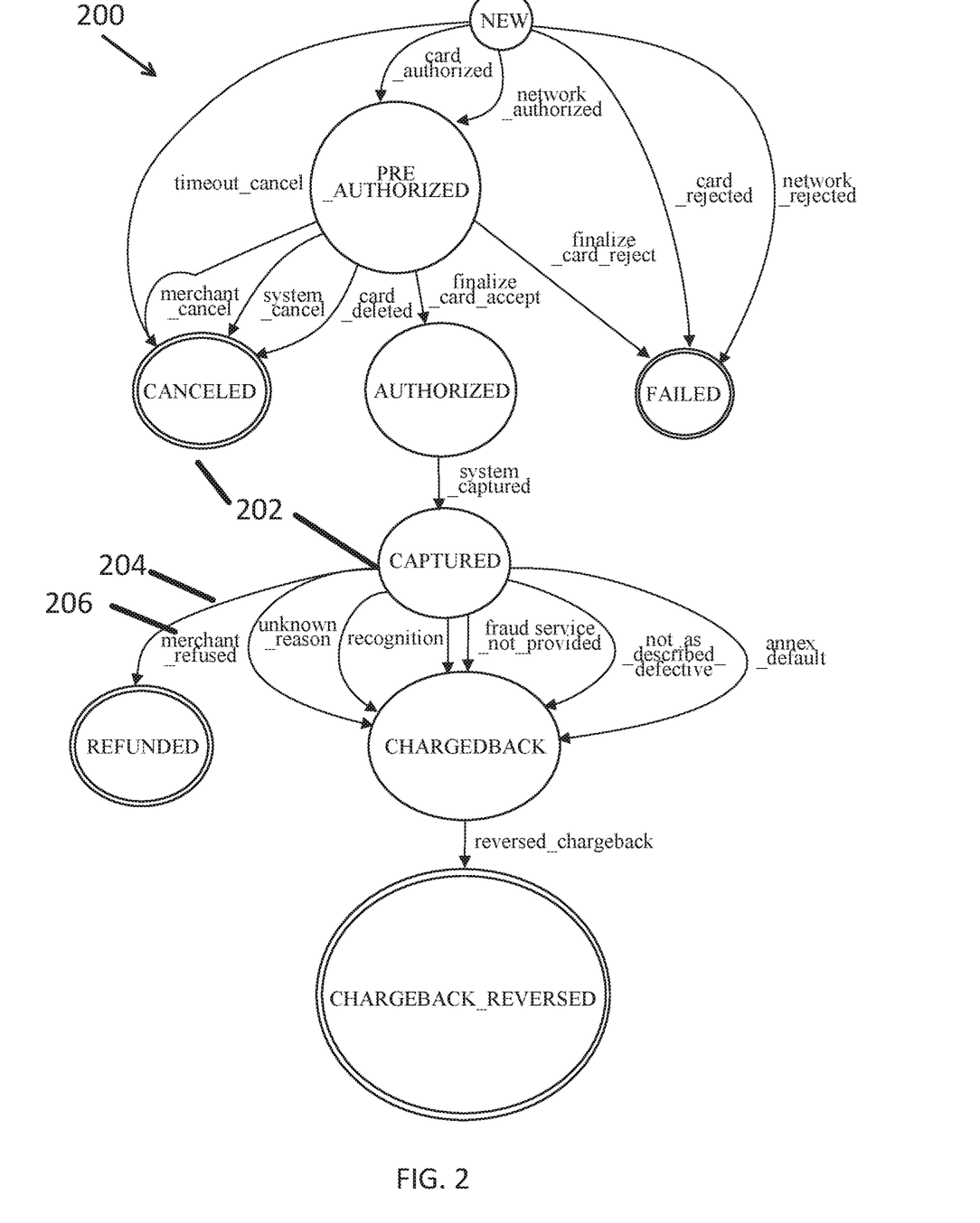
FIG. 2 depicts a non-limiting example of a typed payment graph used by the system for automated electronic payment processing in accordance with some embodiments.

In the example of FIG. 1, the electronic payment processing engine 104 is configured to declaratively define schemas for payment graphs used for various types of electronic payment processing. Here, the types of the electronic payment processing as represented by the payment graphs include but are not limited to credit card, ACH, EMV, etc. FIG. 2 depicts a non-limiting example of a typed payment graph 200 used by the electronic payment processing engine 104 for automated electronic payment processing. As shown in the example of FIG. 2, the payment graph 200 is a directed multigraph having a collection of nodes/vertices (V) 202, directed edges (E) 204, and attributes (A) 206, which are payloads associated with the edges, wherein multiple directed edges may be present between the same pair of vertices (e.g., CAPTURED and CHARGEBACK) in the directed multigraph. The vertices 202 of the payment graph 200 represent a plurality of payment states in the lifecycle of the electronic payment and the edges 204 of the payment graph represent valid transitions between the payment states during the payment lifecycle. A path that from one vertex (payment state A) to another (payment state B) includes a plurality of vertices 202 connected by directed edges 204 in the payment graph 200, wherein the path represents an audit trail of the lifecycle of the electronic payment that includes different types of attributes (payloads) recorded along the path for risk analysis.

In some embodiments, the payment graph 200 is also a typed graph, wherein each of the vertices 202, edges 204, and the attributes 206 associated with the edges are explicitly and declaratively defined (or "typed") by the electronic payment processing engine 104 via a schema to be of certain types, which are names/identifications of the entities used to prevent errors during electronic payment processing. The collection of the entities (V/E/A) in the typed payment graph represents the schema (S) of the typed payment graph. Defining (or typing) entities of the payment graph 200 is important since it allows the graph-based electronic payment processing system to definitely differentiate between the multiple edges that connect a same pair of vertices without ambiguity. Additionally, typed vertices, edges and attributes together support automatic type checking at compile time of the typed payment graph for type safety, which a "label" (typically represented as String type) is not sufficient to achieve.

In a multigraph-based system such as the electronic payment processing system 100 based on the payment graph, multiple edges (or paths) may connect the same two vertices (e.g., A and B) in some instances, wherein the payloads or "events" of the edges determine which path to take from A to B. In some instances, although an edge may be present between two vertices in the payment graph, it is conditional, e.g., it can only be traversed during electronic payment processing if some preconditions are met, wherein such preconditions are also referred to as guards, which represent the notion of preconditions that applies to a specific edge. For a non-limiting example, while it may be possible to move/transition a specific electronic payment from Authorized state to Captured state in the payment graph 200, such transition is conditional not automatic, as the electronic payment processing engine 104 may exert more control over when to move the electronic payment to the Captured state via a guard that captures such conditional transition.

Figure 3:
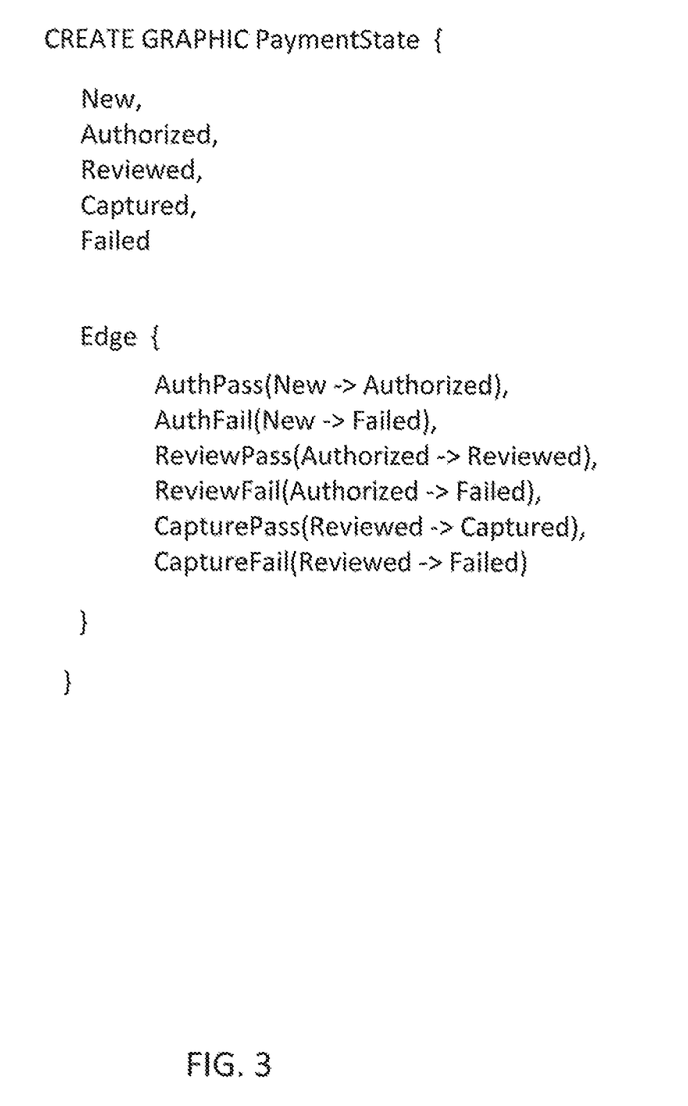
FIG. 3 depicts a non-limiting example of a payment graph as defined via a snippet of DDL code in accordance with some embodiments.

In some embodiments, the electronic payment processing engine 104 is configured to define the types of entities (V/E/A) in a payment graph declaratively either via a Data Definition Language (DDL) or via a language specific construct (e.g. a class declaration). FIG. 3 depicts a non-limiting example of a payment graph as defined via a snippet of DDL code. As defined by the DDL snippet of FIG. 3, the payment graph includes payment states of New, Authorized, Reviewed, Captured, and Failed, and edges of AuthPass, AuthFail, ReviewPass, ReviewFail, CapturePass, and CaptureFail between the states. Here, each edge is defined by the tuple type (src, dst) where src and dst are payment states (vertices). Under such this payment graph definition, it is only possible to transition from one vertex/payment state to another if there being an explicit edge between the vertices, which guarantees the payment graph is well-formed and the electronic payment will not get stuck during processing.

Figure 4:
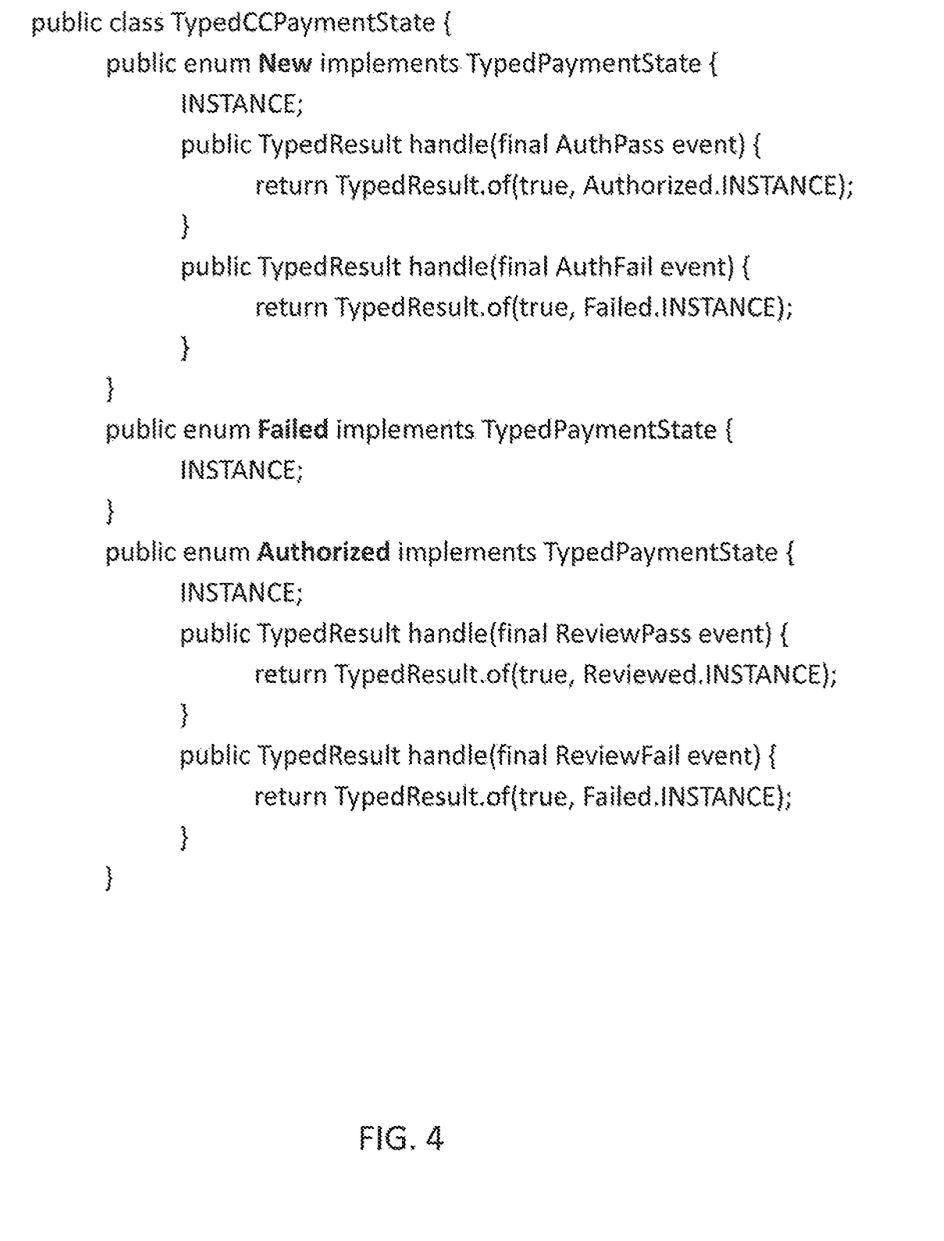
FIG. 4 depicts a non-limiting example of software program code generated from the snippet of DDL code in accordance with some embodiments.

In some embodiments, the electronic payment processing engine 104 is configured to process/compile the DDL code into software program code such as Java code and/or Application Programming Interface (API) via a code generation tool (e.g., a complier) for real time electronic payment processing. FIG. 4 depicts a non-limiting example of a portion of the software program code generated from the snippet of DDL code, wherein the portion of the software program code includes the following types:

States (New, Failed, Authorized, Captured)
Edges/Events (AuthPass, AuthFail, ReviewPass, ReviewFail)

In this example, each state is defined to only handle ("receive") the edges/events defined in the associated DDL. By using a statically typed language like Java, the electronic payment processing engine 104 is configured to leverage the type system of the implementation language to guarantee that it will only make correct state transitions and that the persisted data will be well-formed, assuming the persistent payment graph datastore 106 is robust and reliable.

Once the payment graphs are defined, they are persisted (stored) in the payment graph datastore 106 for payment processing by the electronic payment processing engine 104. In the example of FIG. 1, payment graph datastore 106 is configured to maintain/persist various instances of payment graphs including all of its entities (V/E/A) and types. Unlike a relational database that is based on relational tables, the payment graph datastore 106 is optimized for graphs and supports graph-based queries to the payment graphs stored in it to achieve a highly scalable and robust graph-based electronic payment processing system. Specifically, the payment graph datastore 106 is configured to support at last the following:

CRUD (Create, Read, Update and Delete) operations on the payment graph and its entities—vertices, edges, attributes, and paths;

Query operations based on types of the vertices, edges, attributes, and paths of the payment graph.

Upon receiving a payment request (e.g., to create a payment) from a client device 108 at runtime, the electronic payment processing engine 104 is configured to retrieve a schema of a payment graph corresponding to the type of the payment request (e.g. EMV) from the payment graph datastore 106 and to create a new instance of payment graph corresponding to the retrieved schema. As the electronic payment is processed through various states in its lifecycle by for example, calling the software program code (e.g., APIs) generated from the DDL, the electronic payment processing engine 104 is configured to process the electronic payment based on types of states, edges, and attributes of the edges while traversing through the states and edges in the instance of the payment graph based on processing results at each of the states by one or more internal or external online electronic processing parties. Here, the payment may only transition from one state to another if there is an edge between them and a precondition/guard on the edge is met by the processing results. At all stages of the payment lifecycle, the payment graph datastore 106 is continuously updated in real time so that it maintains the latest states and state transitions through the instance of the payment graph at all times by the electronic payment processing engine 104. After the processing is done, the electronic payment processing engine 104 is configured to provide the processing result of the electronic payment back to the client device 108.

In some embodiments, the electronic payment processing engine 104 is configured to automatically record and build an audit trail for the electronic payment (as well as all electronic payments concurrently being processed online by the system 100) based on the updated states and state transitions in the payment graph datastore 106 for real time or future analysis. As discussed above, the audit trail is a path from one payment state to another that includes a plurality of vertices connected by directed edges in the payment graph, wherein the audit trail includes different types of attributes (payloads) recorded along the path for risk analysis. The audit trail is the sum total of recorded state transitions for the electronic payment with all state transitions fully accounted for. For a non-limiting example, the following table reflects an audit trail for electronic payment with payment_id=1000, wherein each row describes a transition from state src to state dst via an edge and each of the entities (V/E) is typed accordingly. Note that a state transition may also contain payload of the edge (not included in this example).

| id | payment_id | src | dst | edge |
|---|---|---|---|---|
| 2620 | 1000 | NEW | PRE_AUTHORIZED | NETWORK_AUTHORIZED |
| 2621 | 1000 | PRE_AUTHORIZED | AUTHORIZED | FINALIZE_CARD_ACCEPT |
| 2622 | 1000 | AUTHORIZED | CAPTURED | SYSTEM_CAPTURED |

Given the recorded state transitions, the electronic payment processing engine 104 is configured to re-create the complete audit trail of any payment in the system 100. If the processing of an electronic payment by the electronic payment processing engine 104 fails at any given point, the payment graph datastore 106 is not adversely affected and a subsequent restart of the processing of the electronic payment by the electronic payment processing engine 104 only needs to pick up the last valid state of the electronic payment based on its audit trail from the payment graph datastore 106 and to continue processing the electronic payment without a hitch.

In some embodiments, the electronic payment processing engine 104 is configured to perform automatic static type checking of the electronic payment graph both at the DDL level when the DDL code is compiled to define the payment graph and at runtime when the software program code is generated from the DDL code to process the electronic payment. Potential errors can be caught at both the development phase of the payment graph and prior to its deployment for electronic payment processing.

Figure 5:
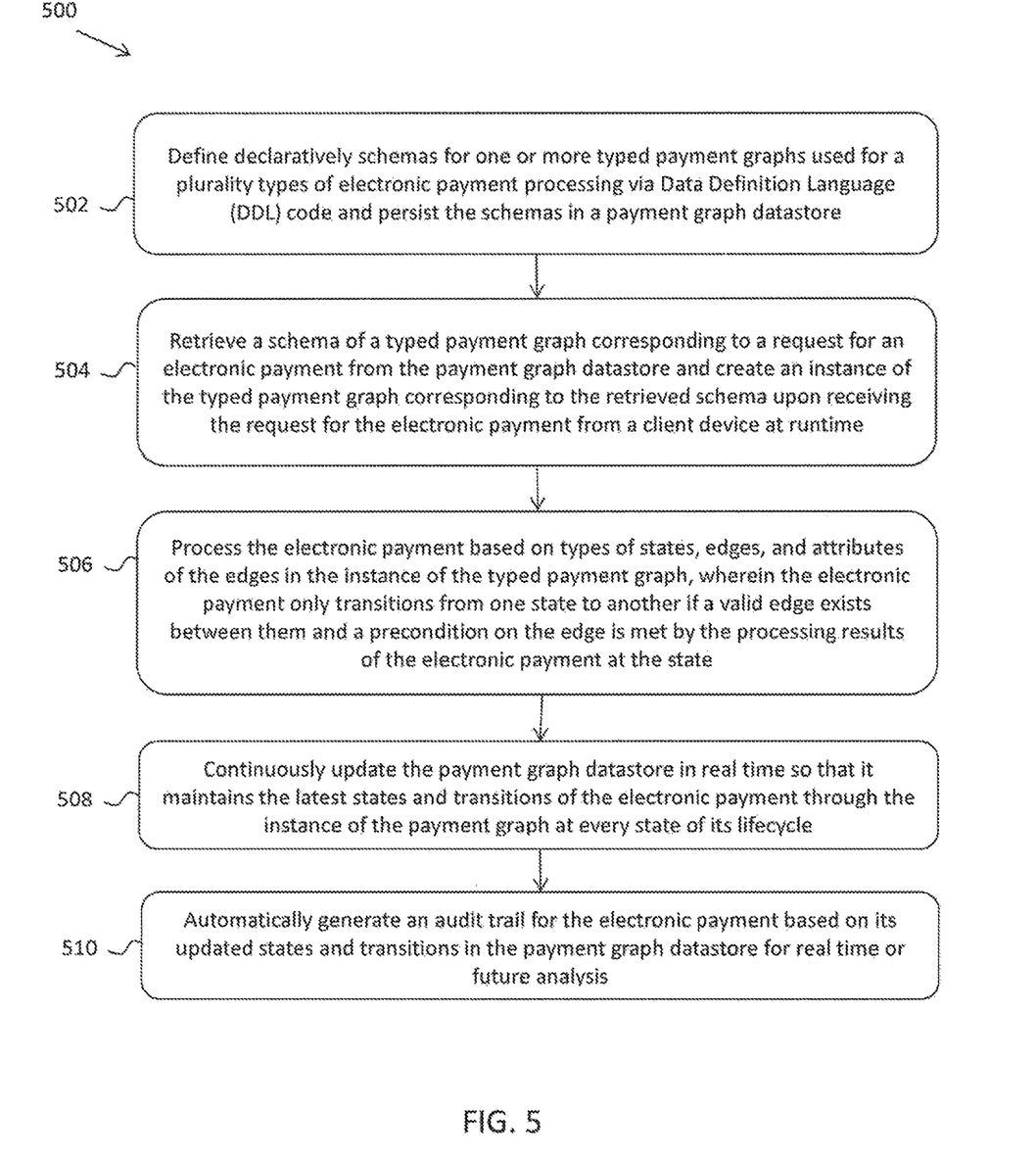
FIG. 5 depicts an example of a flowchart of a process to support typed payment graph-based electronic payment processing in accordance with some embodiments.

FIG. 5 depicts an example of a flowchart of a process to support typed payment graph-based electronic payment processing. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 5, the flowchart 500 starts at block 502, where schemas for one or more typed payment graphs used for a plurality types of electronic payment processing are defined declaratively via Data Definition Language (DDL) and persisted in a payment graph datastore. The flowchart 500 continues to block 504, where a schema of a typed payment graph corresponding to the type of a request for an electronic payment received is retrieved from the payment graph datastore and an instance of the typed payment graph corresponding to the retrieved schema is created upon receiving the request for the electronic payment from a client device at runtime. The flowchart 500 continues to block 506, where the electronic payment is processed by traversing states and edges in the instance of the typed payment graph, wherein the electronic payment only transitions from one state to another via an edge between them during its payment lifecycle if a precondition on the edge is met by the processing results of the electronic payment at the state. The flowchart 500 continues to block 508, where the payment graph datastore is continuously updated in real time so that it maintains the latest states and transitions of the electronic payment through the instance of the payment graph at every state of its lifecycle. The flowchart 500 ends at block 510, where an audit trail is automatically generated for the electronic payment based on its updated states and transitions in the payment graph datastore for real time or future analysis.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support typed payment graph-based electronic payment processing, comprising:
    an electronic payment processing engine running on a host, which in operation, is configured to:
        define declaratively schemas for one or more typed payment graphs used for a plurality types of electronic payment processing via Data Definition Language (DDL) code and persist the schemas in a payment graph datastore;
        process the DDL code into software program code for real time electronic payment processing;
        perform automatic static type checking of the electronic payment graph both at the DDL level when the DDL code is processed to define the payment graph and at runtime when the software program code isgenerated from the DDL code to process the electronic payment;
        receive a request for an electronic payment from a client device at runtime;
        determine a type of the electronic payment based on the request;
        retrieve a schema of a typed payment graph from the payment graph datastore based on the type of the request;
        generate an instance of the typed payment graph corresponding to the retrieved schema, wherein the instance of the typed payment graph comprises types of states, edges connecting the types of states, and attributes identifying a precondition of the edges, wherein each of the types of states is associated with a type of payment processing;
        determine a current state of the electronic payment based on the instance of the typed payment graph, wherein the types of states comprise a first state and a second state, the determination comprising:

(i) executing, for the first state, the associated type of payment processing for the electronic payment to generate processing results;
(ii) determining, for the first state, whether an edge to the second state is valid based on an attribute of the edge and the generated processing results;
(ii) determining the second state to be the current state of the electronic payment when the edge is valid; and
(iii) determining the first state to be the current state of the electronic payment when the edge is not valid;
store the instance of the typed payment graph and the current state in the payment graph datastore;
continuously update the payment graph datastore in real time so that it maintains the latest states and transitions of the electronic payment through the instance of the payment graph at every state of its lifecycle;
automatically generate an audit trail for the electronic payment based on its updated states and transitions in the payment graph datastore for real time or future analysis;
store the audit trail in the payment graph datastore; and
transmit, in response to the request, the current state of the electronic payment to the client device.

2. The system of claim 1, wherein:
the typed payment graph is a directed multigraph having multiple edges between at least one pairs of vertices in the typed payment graph.

3. The system of claim 1, wherein:
the audit trail is a path that includes a plurality of states connected by directed edges from one payment state to another in the typed payment graph, wherein the audit trail includes different types of attributes recorded along the path for risk analysis.

4. The system of claim 1, wherein:
the electronic payment processing engine is configured to check the types of the states, edges, and attributes of the edges in the typed payment graph for type safety before runtime to prevent errors during processing of the electronic payment.

5. The system of claim 1, wherein:
the software program code includes an Application Programming Interface (API).

6. The system of claim 1, wherein:
the payment graph datastore is configured to support graph-based queries to the typed payment graphs stored in it to support the typed payment graph-based electronic payment processing.

7. The system of claim 6, wherein:
the payment graph datastore is configured to support create, read, update and delete (CRUD) operations on the payment graph and its states, edges, attributes, and paths.

8. The system of claim 6, wherein:
the payment graph datastore is configured to support query operations based on the types of the states, edges, attributes, and paths of the payment graph.

9. The system of claim 1, wherein:
the electronic payment processing engine is configured to restart processing of the electronic payment by picking up a last valid state of the electronic payment based on the audit trail and to continue processing the electronic payment if processing of the electronic payment fails at any point.

10. A computer-implemented method to support typed payment graph-based electronic payment processing, comprising:

defining declaratively schemas for one or more typed payment graphs used for a plurality types of electronic payment processing via Data Definition Language (DDL) code and persisting the schemas in a payment graph datastore;
processing the DDL code into software program code for real time electronic payment processing;
performing automatic static type checking of the electronic payment graph both at the DDL level when the DDL code is processed to define the payment graph and at runtime when the software program code is generated from the DDL code to process the electronic payment;
receiving a request for an electronic payment from a client device at runtime;
determining a type of the electronic payment based on the request;
retrieving a schema of a typed payment graph from the payment graph datastore based on the type of the request;
generating an instance of the typed payment graph corresponding to the retrieved schema, wherein the instance of the typed payment graph comprises types of states, edges connecting the types of states, and attributes identifying a precondition of the edges, wherein each of the types of states is associated with a type of payment processing;
determine a current state of the electronic payment based on the instance of the typed payment graph, wherein the types of states comprise a first state and a second state, the determination comprising:
(i) executing, for the first state, the associated type of payment processing for the electronic payment to generate processing results;
(ii) determining, for the first state, whether an edge to the second state is valid based on an attribute of the edge and the generated processing results;
(ii) determining the second state to be the current state of the electronic payment when the edge is valid; and
(iii) determining the first state to be the current state of the electronic payment when the edge is not valid;
storing the instance of the typed payment graph and the current state in the payment graph datastore;
continuously updating the payment graph datastore in real time so that it maintains the latest states and transitions of the electronic payment through the instance of the payment graph at every state of its lifecycle;
automatically generating an audit trail for the electronic payment based on its updated states and transitions in the payment graph datastore for real time or future analysis;
storing the audit trail in the payment graph datastore; and
transmitting, in response to the request, the current state of the electronic payment to the client device.

11. The computer-implemented method of claim 10, wherein:
the audit trail is a path that includes a plurality of states connected by directed edges from one payment state to another in the typed payment graph, wherein the audit trail includes different types of attributes recorded along the path for risk analysis.

12. The computer-implemented method of claim 10, further comprising:

checking the types of the states, edges, and attributes of the edges in the typed payment graph for type safety before runtime to prevent errors during processing of the electronic payment.

13. The computer-implemented method of claim 10, further comprising:
supporting graph-based queries to the typed payment graphs stored in it to support the typed payment graph-based electronic payment processing.

14. The computer-implemented method of claim 13, further comprising:
supporting create, read, update and delete (CRUD) operations on the payment graph and its states, edges, attributes, and paths.

15. The computer-implemented method of claim 13, further comprising:
supporting query operations based on the types of the states, edges, attributes, and paths of the payment graph.

16. The computer-implemented method of claim 10, further comprising:
restarting processing of the electronic payment by picking up a last valid state of the electronic payment based on the audit trail and to continue processing the electronic payment if processing of the electronic payment fails at any point.

17. A non-transitory computer readable storage medium having software instructions stored thereon that when executed cause a system to:
define declaratively schemas for one or more typed payment graphs used for a plurality types of electronic payment processing via Data Definition Language (DDL) code and persist the schemas in a payment graph datastore;
process the DDL code into software program code for real time electronic payment processing;
perform automatic static type checking of the electronic payment graph both at the DDL level when the DDL code is processed to define the payment graph and at runtime when the software program code is generated from the DDL code to process the electronic payment;
receive a request for an electronic payment from a client device at runtime;
determine a type of the electronic payment based on the request;
retrieve a schema of a typed payment graph from the payment graph datastore based on the type of the request;
generate an instance of the typed payment graph corresponding to the retrieved schema, wherein the instance of the typed payment graph comprises types of states, edges connecting the types of states, and attributes identifying a precondition of the edges, wherein each of the types of states is associated with a type of payment processing
determine a current state of the electronic payment based on the instance of the typed payment graph, wherein the types of states comprise a first state and a second state, the determination comprising:
(i) executing, for the first state, the associated type of payment processing for the electronic payment to generate processing results;
(ii) determining, for the first state, whether an edge to the second state is valid based on an attribute of the edge and the generated processing results;
(ii) determining the second state to be the current state of the electronic payment when the edge is valid; and
(iii) determining the first state to be the current state of the electronic payment when the edge is not valid;
store the instance of the typed payment graph and the current state in the payment graph datastore;
continuously update the payment graph datastore in real time so that it maintains the latest states and transitions of the electronic payment through the instance of the payment graph at every state of its lifecycle;
automatically generate an audit trail for the electronic payment based on its updated states and transitions in the payment graph datastore for real time or future analysis;
store the audit trail in the payment graph datastore; and
transmit, in response to the request, the current state of the electronic payment to the client device.

* * * * *